Nov. 25, 1969  D. G. MALLORY ET AL  3,480,360
XEROGRAPHIC COPYING APPARATUS

Filed Oct. 13, 1966  11 Sheets-Sheet 1

INVENTORS
DONALD G. MALLORY
RAYMOND J. ASHTON
ROBERT H. LIVA
BY

ATTORNEYS

Nov. 25, 1969   D. G. MALLORY ET AL   3,480,360
XEROGRAPHIC COPYING APPARATUS
Filed Oct. 13, 1966   11 Sheets-Sheet 2

INVENTORS
DONALD G. MALLORY
RAYMOND J. ASHTON
ROBERT H. LIVA
BY
ATTORNEYS

INVENTORS
DONALD G. MALLORY
RAYMOND J. ASHTON
ROBERT H. LIVA
BY
ATTORNEYS

INVENTORS
DONALD G. MALLORY
RAYMOND J. ASHTON
ROBERT H. LIVA
BY
ATTORNEYS 3,480,360
XEROGRAPHIC COPYING APPARATUS
Donald G. Mallory, Penfield, and Raymond J. Ashton and Robert H. Liva, Rochester, N.Y., assignors to Xerox Corporation, Rochester, N.Y., a corporation of New York
Filed Oct. 13, 1966, Ser. No. 586,477
Int. Cl. G03g 5/00; G03b 27/52, 27/70
U.S. Cl. 355—8
12 Claims

ABSTRACT OF THE DISCLOSURE

A multi object plane, copying apparatus for reproducing optical images on an image plane. The image reproduced is of data from an object at one of the object planes while optical elements within the apparatus cut off image light rays from the other object planes. The object planes are positioned to present different magnifications of the objects thereon at the image plane.

---

This invention relates to improvements in automatic xerographic reproduction systems and particularly to improvements in systems of this type to facilitate the making of enlarged xerographic reproductions from semi-micro data while maintaining capabilities of making direct xerographic reproductions of standard sized data.

Both manual and automatic machines for carrying out xerographic reproduction processes are in wide commercial use. For the most part, each of such devices has been specifically designed to the solution of a particular, singular reproduction problem, and for the most part, has been limited to the particular use intended. Thus, for example, machines are presently in commercial use for reproduction of documents, reproduction and enlargement of micro-data from microfilm input, and reproduction and enlargement of semi-micro data reduced approximately 3× from the original and maintained generally on data processing cards. No singular machine or system, however, is currently in use for both the direct xerographic copying of documents or other objects and the enlarging and copying of semi-micro data of approximately 3× reduction from the original. The present invention constitutes a further improvement in automatic xerographic processing systems whereby such systems may be employed to directly reproduce a document or object and also to reproduce a semi-micro document while enlarging it approximately 3 times.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem, the mere protection of the records of a business may be considered. As a safeguard against destruction of records by fire, flood, or other disaster, it became a common practice periodically to microfilm the records of many firms and to store these microfilms at locations and under conditions to prevent their inadvertent destruction. Although this technique was effective to preserve the records for possible future reference, it merely added another expense to the record-keeping burden without, in any way, simplifying the handling or maintaining of the records. This condition was inherent, first, since the primary purpose was to remove the microfilm records from everyday use and, second, because of the relative inaccessibility of selected records contained on such microfilm.

Recently, there has been developed a system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon. However, the use of aperture cards has required the added expense in the provision of apparatus for microfilming records and for mounting the microfilm frames on processing cards.

In the use of the conventional microfilm reproduction apparatus, the microfilm card comprises a conventional record card of the type widely used in record-controlled accounting and tabulating systems but it is provided with an aperture in which a microfilm frame may be inserted and permanently secured to the card. When a microfilm frame of data to be reproduced is so mounted in a microfilm card, the card may also be keypunched with appropriate holes and notches representing certain descriptive terms defining, identifying, or relating to the microfilm picture and placed in an index file. Thereafter, these cards may be manually or machine sorted and otherwise processed when the index file is interrogated in accordance with conventional uses of such cards. It will be apparent then that the use of microfilm aperture cards requires the practice of many processing steps and the need for corresponding equipment to practice the process.

However the use of such microfilm cards has made it possible to effect substantial savings in the reproduction of minified records when compared to other systems for the preservation of records. Nevertheless from the standpoint of producing card information microfilm systems require conventional photographic projection equipment to produce the microfilm information. This involved cumbersome, costly, and time-consuming photographic developing techniques that detracted substantially from the overall efficiency of the system.

More recently, there has evolved another form of information retrieval utilizing the standard data processing punch card and index system. Instead of implanting microfilm frames within apertures formed in cards, this new form of information storage requires merely printing in semi-micro size the information or data from a document upon the opaque area of a card that would normally have contained the microfilm frame. In the use of this form, the information or data is reduced in size by approximately 3×, as distinguished from the conventional 15× or 20× for microfilm aperture cards, thus enabling the operator to quickly and directly scan the data on the card for determining relevance for his purpose without the need for projectors, viewers, or the like. This advantage, together with the particular advantage that these cards may be duplicated with greater ease than is the case for aperture cards, thereby permitting more extensive dissemination of the information on a card, renders this new form of information storage and retrieval a serious competitor of the aperture card system.

The present invention avoids the disadvantages of the microfilm reproduction processes by eliminating altogether the need for microfilm aperture cards while still utilizing the advantages of a punched-card system and the standard processing cards for containing minified records, etc.

As previously stated, a typical semi-micro data or information card contemplated herein is the type which has printed thereon a typical record in miniature size formed thereon by a suitable printing process such as, for example, by xerography.

By means of the present invention, it is possible to reproduce information from processing cards or other semi-micro data bearing object conveniently, economically, and at a rate of speed that contributes substantially to the utility and effectiveness of a semi-micro record system.

An object of the invention is to improve automatic xerographic processing systems for use in semi-micro data processing systems.

A further object of the invention is to improve automatic xerographic processing systems to facilitate the enlargement and reproduction of copy from semi-micro records while maintaining capabilities of the automatic xerographic processing systems to make direct copies from other objects.

Yet another object of this invention is to provide a multiple input exposure system into a xerographic apparatus while maintaining single processing systems at the other stations of the apparatus.

Still a further object of this invention is to provide a selective multiple input optical system into a xerographic apparatus.

A further object is to provide improved apparatus for copying data from documents at one object plane or enlarging and copying data from documents at another object plane.

These and other objects of the invention are attained by means of an improved xerographic processing system that is provided with multi-modal operation employing multiple projection systems with one radiation sensitive image receptor and one processing system for selectively making direct or enlarged copies from objects placed at one of the projection system object planes. The copying process is accomplished by projecting an image from one of the projection systems in timed relation to the movement of a sensitized xerographic plate whereby the radiation is made effective to form a latent image on the xerographic plate. Thereafter, the electrostatic latent image is developed by a cascade developing system to form a xerographic powder image of the image on the sensitized plate. In addition, a paper feeding device is arranged to present transfer material into surface contact with the xerographic plate and the electrostatic force developed in the transfer of the xerographic powder image to the transfer material is effective electrostatically to tack the transfer material to the plate surface to insure synchronism of movement therewith. After image transfer, the transfer material is passed through a fusing apparatus where the xerographic powder image is permanently affixed to the transfer material. The apparatus also includes means for selecting the copy mode or the semi-micro enlarging mode by activating one of said projection systems as required.

For a better understanding of the invention as well as other objects and further features thereof, reference is had to the following detailed description of the invention to be read in conjunction with the accompanying drawings wherein:

A preferred form of the invention is shown in the accompanying drawings in which.

Figure 17:
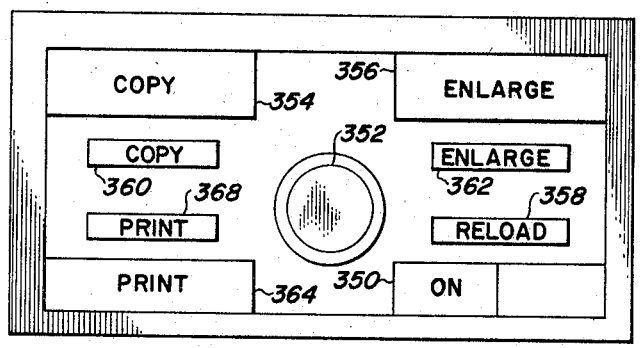
Figure 10:
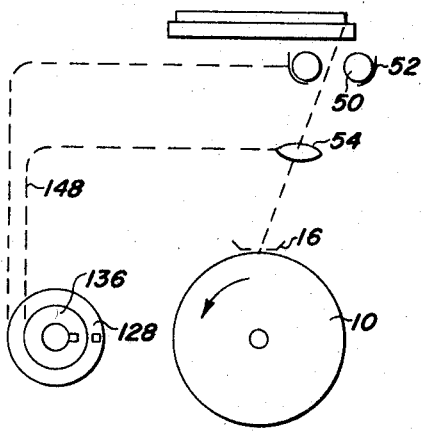
Figure 12:
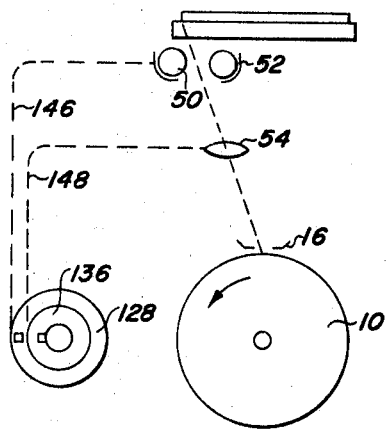
Figure 11:
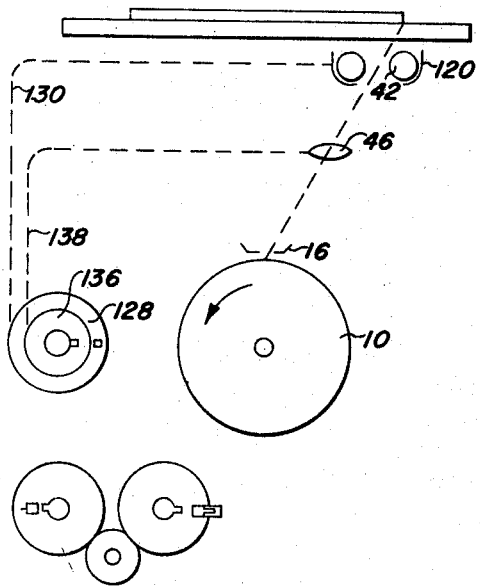
Figure 13:
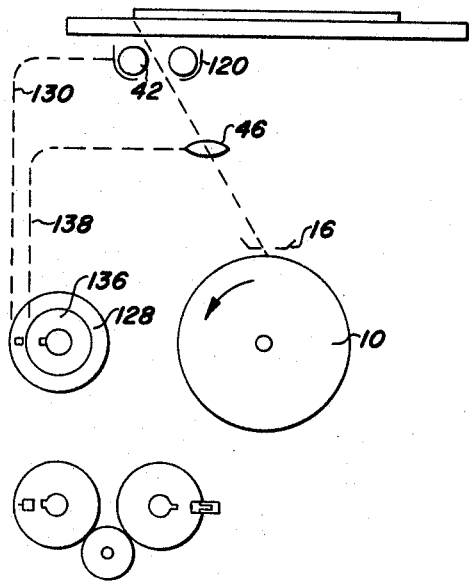
Figure 14:
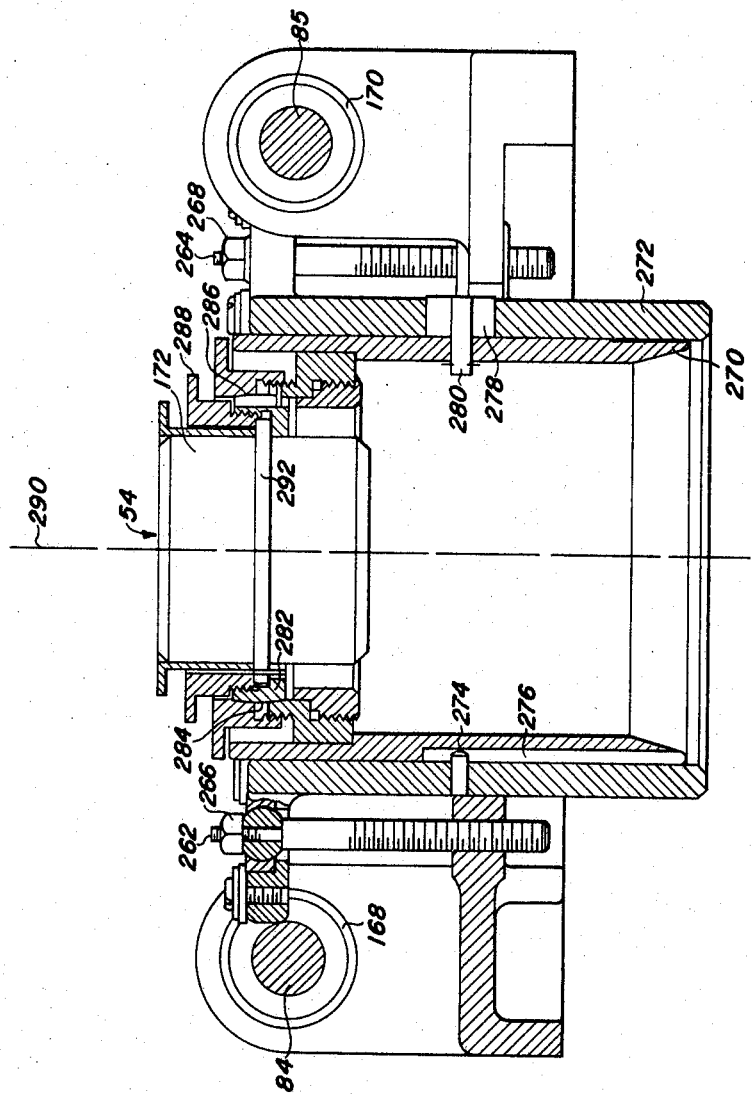
Figure 15:
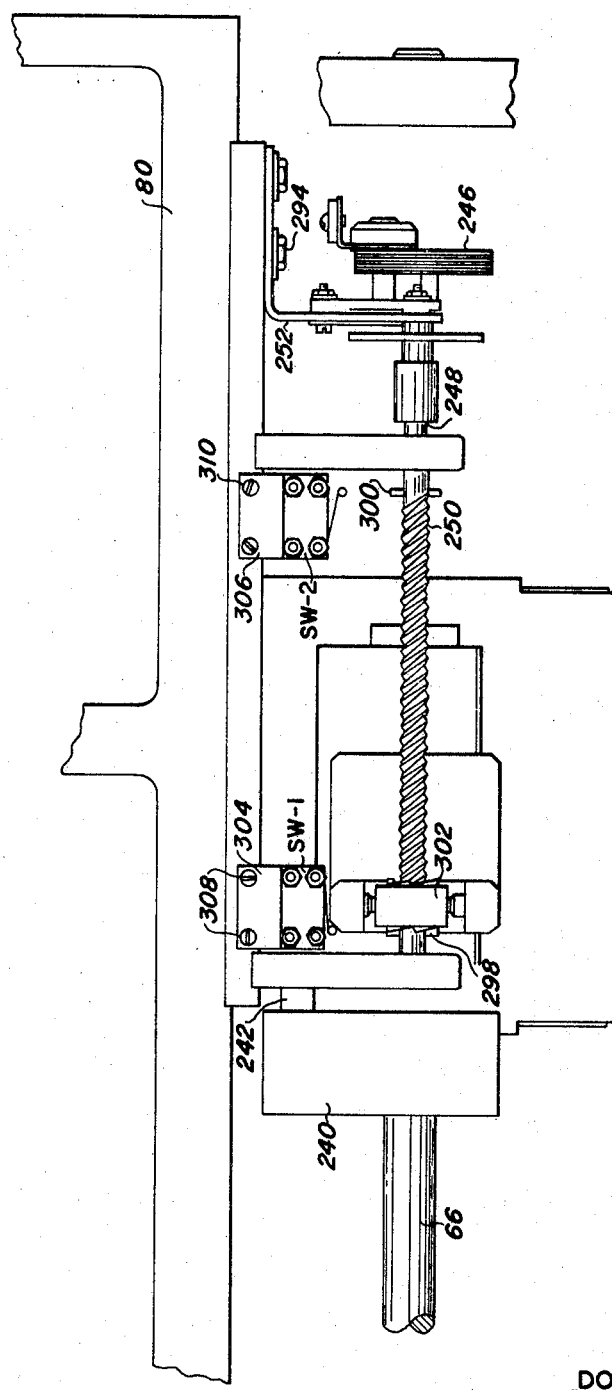
Figure 16:
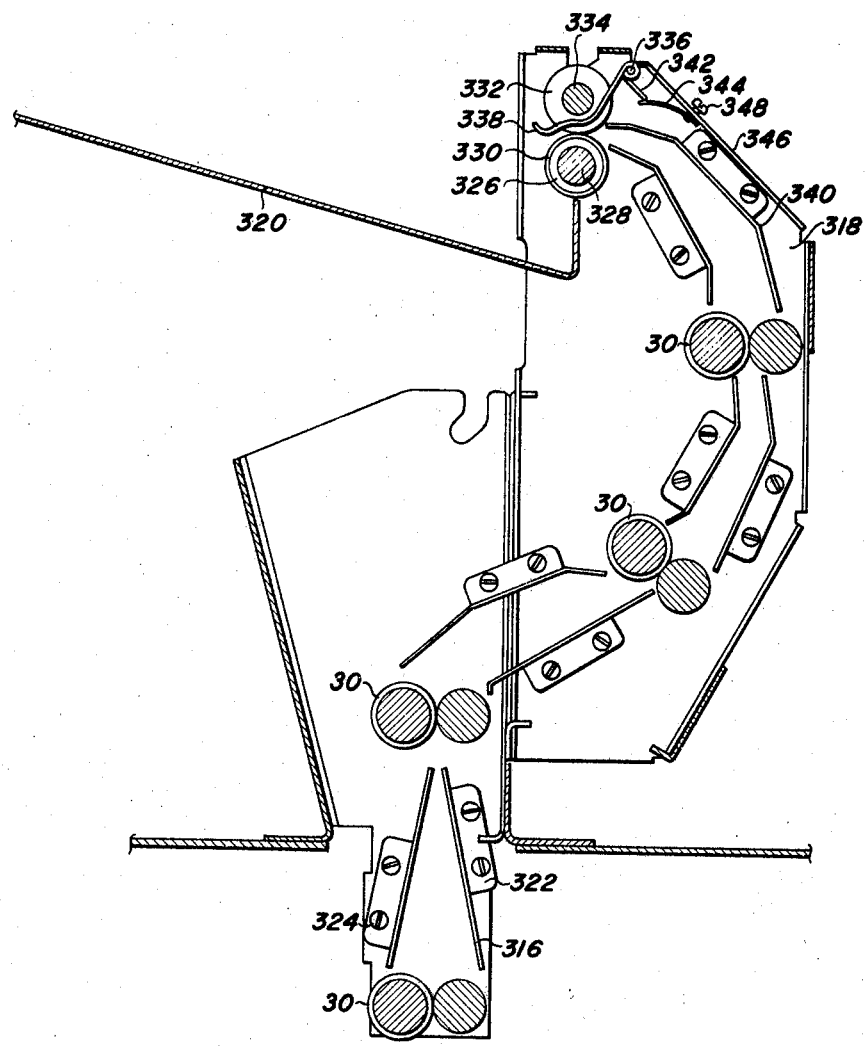

FIGURES 10 and 11 schematically show the scanning apparatus of the semi-micro and copier exposure mechanisms at the start-of-scan position;

FIGURES 12 and 13 schematically show the scanning apparatus of the semi-micro and copier exposure mechanisms at the end-of-scan position;

FIGURE 14 is a front view, partly in section, of the semi-micro lens mounting;

FIGURE 15 is a rear view of the movable image mirror mounting of the copier apparatus;

FIGURE 16 is a side view of the top of the paper transport and collecting tray, with covers removed;

FIGURE 17 is a front view of the control panel.

Figure 1:
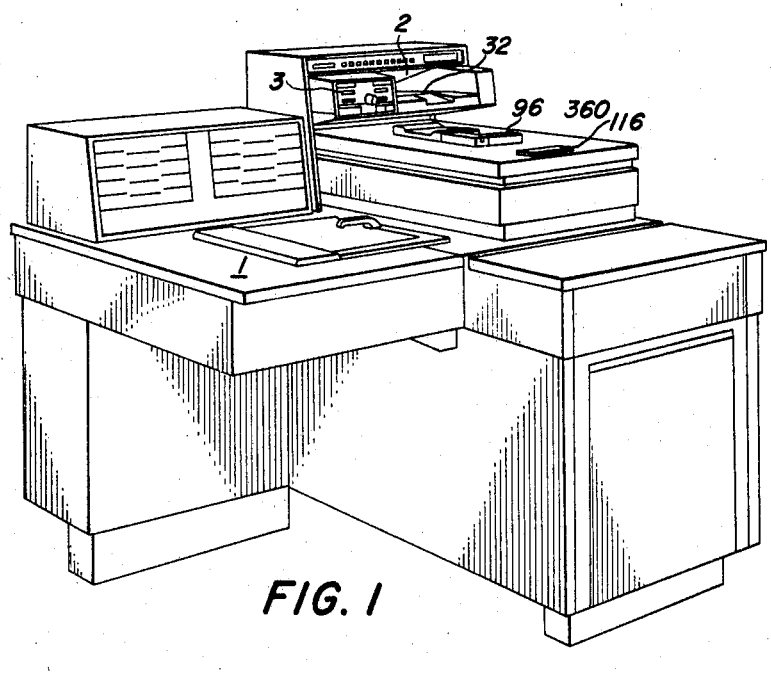
FIGURE 1 is a left-hand perspective view of a xerographic apparatus incorporating two platens serving as object planes for copying standard data and semi-micro data.

Referring now to the drawings, there is shown in FIGURE 1 a xerographic processing machine used for producing xerographic reproductions from a stationary original at either of its two object focal planes. The originals being either formed into copies of the dimension of the original (hereinafter referred to as "standard copying") or enlarged approximately three times ($3\times$, hereinafter referred to as "semi-micro copying" or "enlarging and copying"). The machine is formed into a desklike structure constructed so that an operator may conveniently control all operations of both standard copying and semi-micro-copying from whichever original document is selected.

The desk, generally designated 1, constructed in a conventional manner, has mounted on the top and in the right-hand corner thereof a main control panel for initiating the operation of the machine and for selecting and indicating the number of reproductions to be made and the mode of operation of the machine, as well as a collecting tray for finished reproductions, usually made on paper sheets. Although the reproductions may be discharged from the apparatus for collection at any point accessible externally of the machine, it is preferred that the discharge terminal of the paper feed means be embodied in a super-structure 2 overhanging the rear portion of the desk top, the super-structure also housing the main control panel 3 of the apparatus. The apparatus comprises a xerographic plate including a photoconductive layer or light-receiving surface on a conductive backing and formed in the shape of a drum, gnerally designated by the numeral 10. The drum is mounted on a shaft SH–1 journaled on a frame to rotate in the direction indicated by the arrow to cause the drum surface sequentially to pass a plurality of xerographic processing stations.

Figure 2:
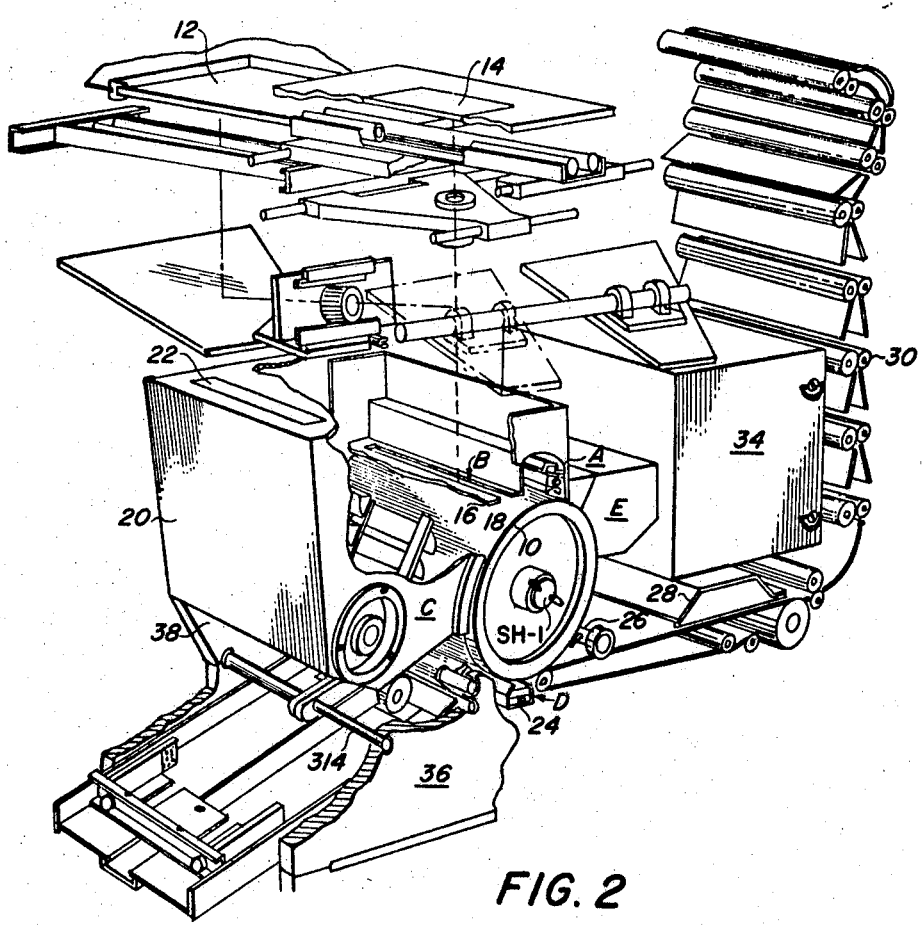
FIGURE 2 is a right-hand perspective view of a xerographic apparatus including optical scanning mechanisms with the covers removed and with several parts shown schematically.

Referring to FIG. 2, and for the purpose of the present disclosure, the several xerographic processing stations in the path of movement of the drum surface may be described functionally as follows:

A charging station A, at which a uniform electrostatic charge is deposited on the photoconductive layer of the xerographic drum.

Next subsequent thereto in the path of motion of the xerographic drum is exposure station B, at which a light or radiation pattern of copy to be reproduced is projected onto the drum surface to dissipate the drum charge in the exposed areas thereof. Thereby, a latent electrostatic image of copy to be produced is formed.

The exposure station may be any of a number of types of mechanisms or members such as an optical scanning or projection system or the like designed to project a line copy image onto the surface of the photoconductive xerographic drum from a stationary original. To permit the versatility of copying at the same dimensions as the document or at an approximately $3\times$ enlarged magnification, the apparatus here is comprised of two platens designating two object planes, one for each of the above capabilities. The optical projection systems are of the type disclosed in Mayo Patent No. 3,062,094, issued Nov. 6, 1962.

The optical scanning or projection assemblies comprise a first platen 12 and second platen 14 which may consist of a transparent plate member such as, for example, a glass plate or the like, positioned parallel to the top of the desk. Platen 12 is adapted to support a master of standard data while platen 14 is adapted to support a document containing semi-micro data. The documents are placed face downward on the upper surface of the appropriate platen which is then uniformly illuminated and arranged in light-projecting relation to the moving light-receiving surface of the xerographic drum 10. Uniform lighting is provided by a pair of lamps attached to a slotted light shield mounted for movement to traverse the plane of each platen.

A light shield 16 adapted to protect the xerographic drum 10 from extraneous light is positioned adjacent to the surface of the xerographic drum. A slot aperture 18 in the light shield extends transversely to the path of movement of the light-receiving surface of the xerographic drum 10 to permit reflected rays from the platen to be directed against a limited transverse area of the light-receiving surface as it passes therebeneath. The optical system of the standard data copying segment of the machine is a folded system enabling it to be enclosed within a conventional-size desk. The semi-micro optical system is a direct system allowing for an approximate 3× enlargement of the semi-micro data located on platen 14 to be reproduced as a latent electrostatic image on the surface of drum 10.

The lenses positioned between the respective platens and the light shield over the drum are arranged for movement in a path to traverse the plane of the platen in timed relation to the movement of he ligh source whereby the subject image of the original, supported by the platen, is scanned in timed relation to the movement of the light receiving surface of the xerographic drum to project an image corresponding to the subject image onto the surface of the xerographic drum.

Adjacent to the exposure station is a developing station C is which there is positioned a developer apparatus including a container 20 for accumulating developer material. A bucket type conveyor 22 having suitable drive means is used to carry the developing material to the upper part of the developer container where it is cascaded down over the xerographic drum. As developer powder images are formed, additional developing particles must be supplied to the developer material in proportion to the amount of developing particles deposited on the drum. For this purpose the developing particles are added to the developer container 20 through slot 22 located in its upper surface. As the developer material is cascaded over the xerographic drum, developing particles are pulled away electrostatically and deposited on the drum to form power images corresponding to the exposed latent electrostatic images on the drum.

Positioned next adjacent to the developing station is the image transfer station D at which the xerographic powder image is elecrostatically transferred from the drum surface to a transfer material or support surface. This is accomplished here by the corotron transfer device 24. Immediately subsequent to transfer is a stripping device, generally designated 26, for removing the transfer material from the drum surface. After stripping, the developed image may be fused to the transfer material by the fuser 28 and then transported by copy guide rollers 30 to copy holder 32.

The final station E is a drum cleaning and discharge station at which the drum surface is brushed to remove residual developer particles remaining after image transfer, and at which the drum surface is exposed to a relatively bright light source to effect substantially complete discharge of any residual electrostatic charge remaining thereon. The removed developer particles are evacuated into filter box 34 for later removal from the machine.

An residual electrical charge remaining on the xerographic drum is dissipated by light from a fluorescent lamp mounted in a suitable lamp housing hinged to the filter box, a starter being provided for energizing the fluorescent lamp.

Suitable drive means drive the drum, lens elements, and slotted light reflectors at predetermined speeds relative to each other and included are means to return the lens elements and the slotted light reflectors to their respective traverse starting position and means to effect operation of the bucket-type conveyor, toner dispenser, endless conveyor, and vertical conveyor.

The xerographic processes as shown in FIG. 2 are mounted on the frames 36 and 38 which are maintained rigidly in spaced relation to each other by any suitable tie plates. The xerographic drum 10 is mounted on horizontal drive shaft SH–1.

In general, the electrostatic charging of the xerographic drum in preparation for the exposure step and the electrostatic charging of the support surface to effect transfer are accomplished by means of a corona generating device whereby electrostatic charge in the order of 500 to 600 volts is applied to the respective surface, in each instance. Although any one of a number of types of corona generating devices may be used, a corona charging device of the type disclosed in Vyverberg Patent No. 2,836,725 is used for both the corona charging device at station A and the corona transfer device 24 at station B, each of which is secured to a suitable frame element of the apparatus and connected to an electrical circuit described hereinafter. Both corona devices operate in the same manner regardless of the exposure mode of the machine. This is also the case for all the other processes and process stations of the xerographic apparatus described, that is, they operate in their usual and described manner whether the exposure station is copying standard data placed on platen 12 or semi-micro data placed on platen 14.

EXPOSURE

Referring now to the exposure mechanism which is composed of two optical scanning or projection assemblies each adapted to scan an object at one of the two platens and to project a flowing image of said object onto the surface of the rotating xerographic drum. The length of scan of the respective projection systems and the projection of the images onto the surface of the drum in synchronization with the movement of said drum is controlled by a single scan control mechanism, generally designated 40 (see FIGS. 4 and 7).

The scanning of the objects at their respective platens in order to present a latent image at the xerographic drum of the apparatus is accomplished by means of two movable lens systems which are moved relative to their respective platens in timed relation to the movement of the xerographic drum. The preferred embodiment of the invention provides illumination to the copy of the platen by fluorescent lamps held in suitable lamp carriages. When these lamps, in their carriages, are moved to traverse the platens, they provide uniform illumination of the document to be copied, or enlarged and copied, depending on the mode of operation of the machine. The copier mode of the machine utilizes a folded optical system which includes its own set of scan lamps 42, fixed object mirror 44, movable scanning lens 46, and movable image mirror 48. The system functions such that the object mirror 44, mounted below the fixed platen 12 of the copier mode, reflects an image from the object to be copied, placed at said platen, through the lens 46 of the lens system onto an image mirror 48 which in turn reflects the image onto the xerographic drum through slit 18 in light shield 16 positioned adjacent to said drum 10. The movable image mirror 48 is maintained in a stationary position while an object is being copied. If the object being copied is located at platen 12, the image mirror 48 is in a first forward position, looking down at the machine, such that it is effective to reflect the light rays emitted from lens 46 onto the xerographic drum through slit 18 while its opaque housing 49 substantially blocks any light rays permeating from platen 14.

The semi-micro optical system for copying from an object placed at platen 14 comprises scan lamps 50 held in scanning carriage 52 so that they provide a uniform illumination of the object to be reproduced. Scanning in timed relation to both the scan lamps 50 and the movement of the xerographic plate is the semi-micro scan lens 54. Since this is a direct optical system, there are no mirrors used to bring the object light rays to the exposure slit 18 and thereby to the xerographic drum. When the apparatus is in the semi-micro mode, the image mirror 48, necessary for producing copies from standard data placed at platen 12, is moved to a second position out of the optical path of both systems, toward the rear of the machine so that the light rays from the object at the platen 14 may pass directly to slit 18 above the xerographic drum while any light rays entering through platen 12 are harmlessly dispersed through the machine without being directly reflected onto the xerographic drum. Light baffles (not shown) are also provided to eliminate extraneous reflected and ambient light.

Figure 3:
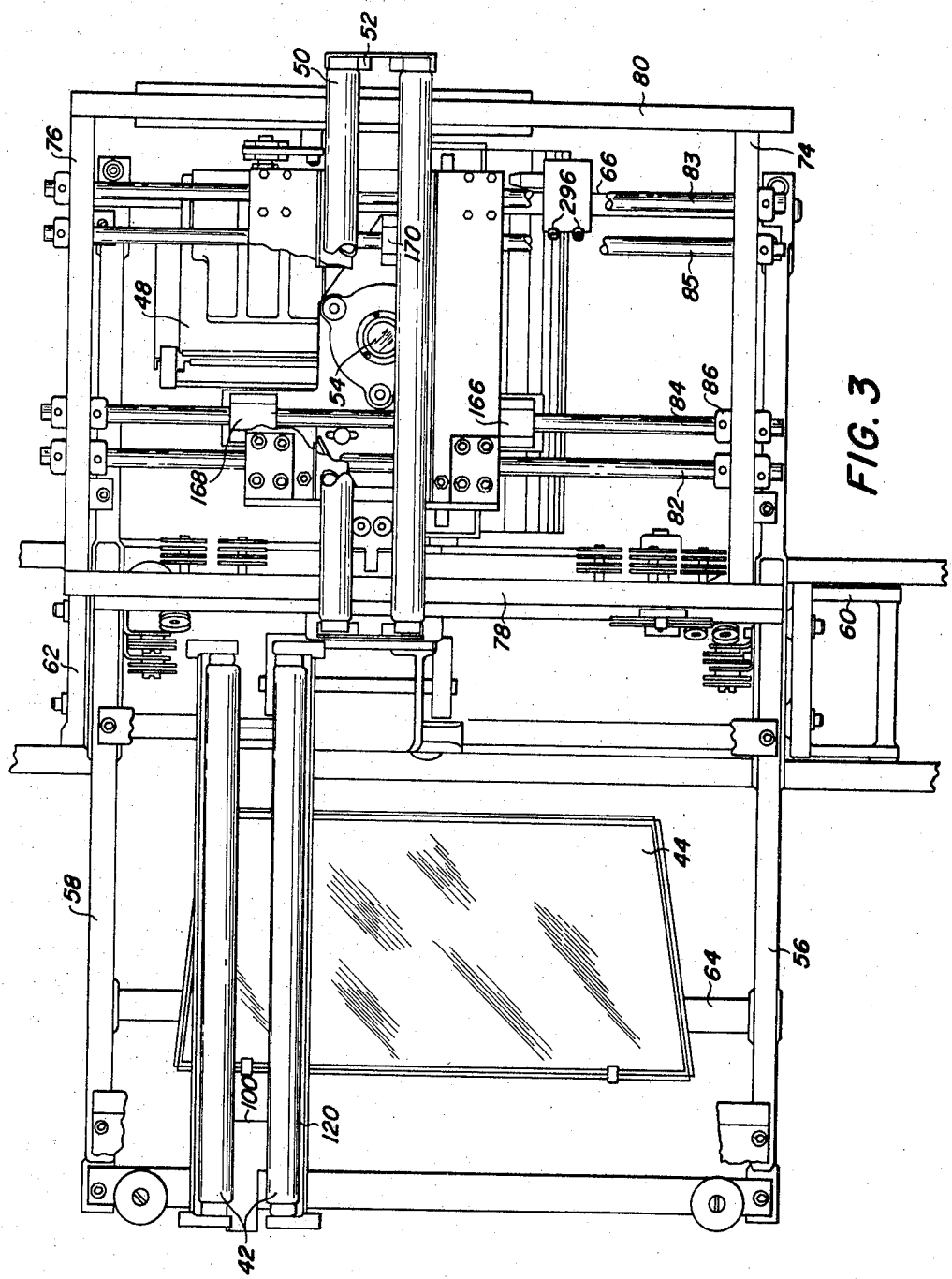
FIGURE 3 is a plan view of the optical apparatus with the platen removed.
Figure 4:
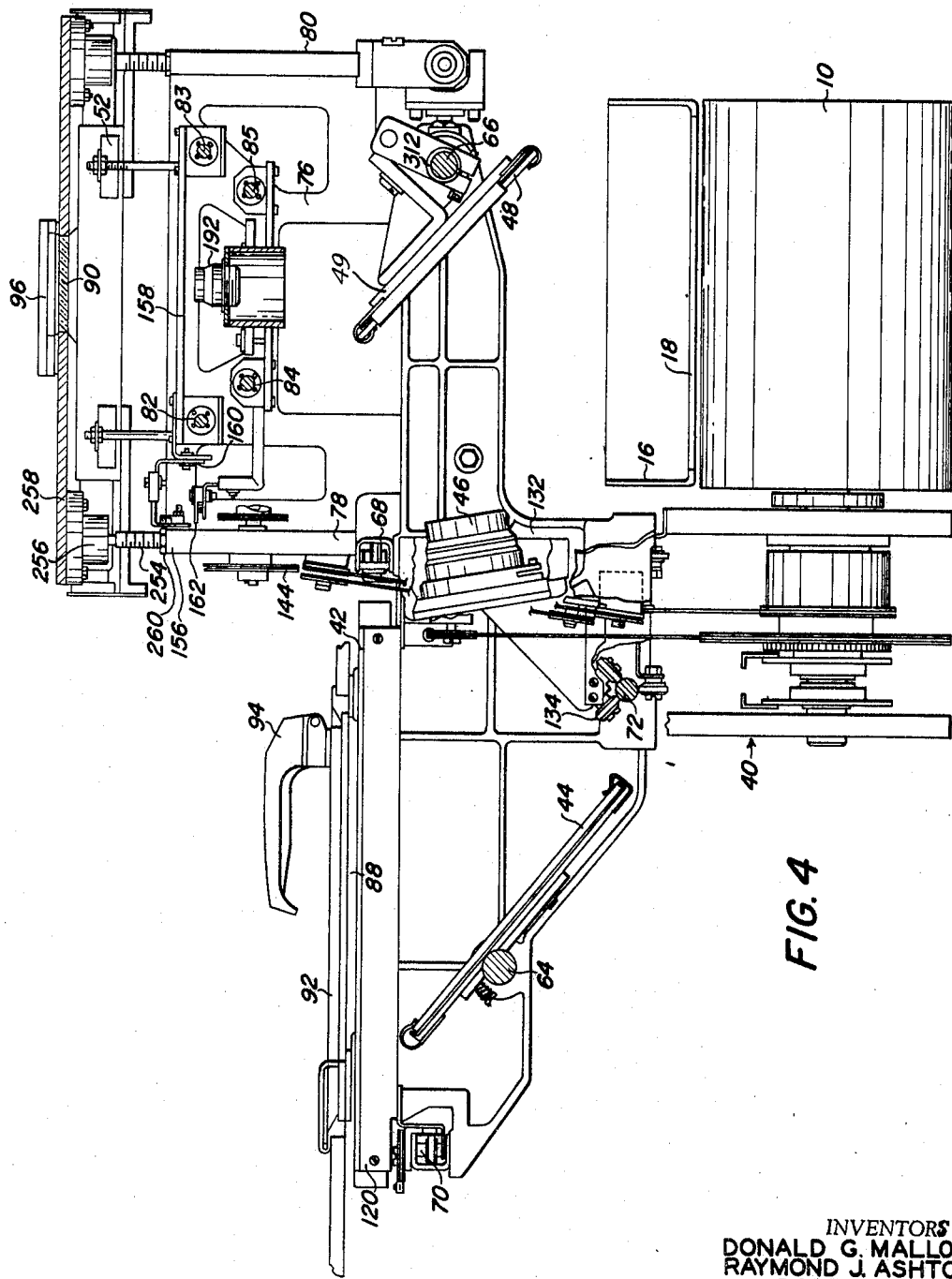
FIGURE 4 is a front view, partly in section, of the optical apparatus.
Figure 6:
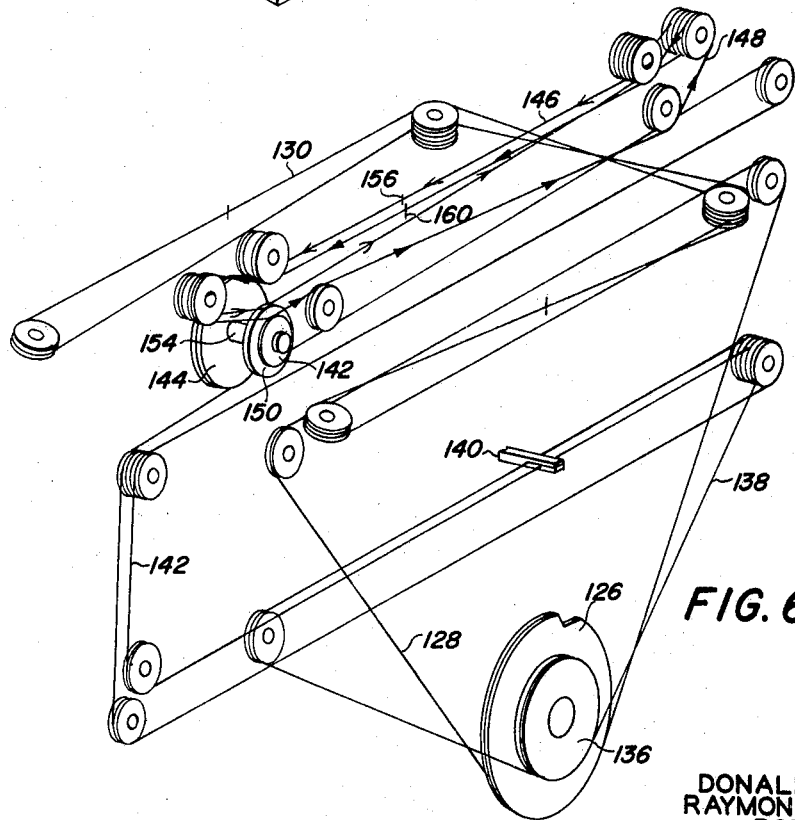
FIGURE 6 is an isometric view of the scanning mechanism cable drives.

Specifically referring to FIGS. 3, 4, and 6, the optical scanning assembly used to project an image from a stationary object at either of the two object planes defined by platens 12 and 14 to the photosensitive surface of the xerographic drum includes optical side plates 56 and 58 which may be formed integrally with the main frame or, optionally, as shown, may be formed as separate plates bolted or otherwise secured to tie plate 60 and 62 of the main frame. The optical side plates 56 and 58 are connected together in fixed parallel relation to each other by object mirror support rod 64, image mirror support shaft 66, lamp carriage support channels 68 and 70 and copier lens carriage rods 72.

Onto these main frames may be fastened as separate plates bolted or otherwise, or formed as an integral part of the main frames, the enlarger-copier frames 74 and 76 to which are bolted the enlarger-copier side plates 78 and 80. The enlarger-copier frames and side plates may also be cast as one piece with the main frames and side plates. The frames are adapted to rigidly maintain the enlarger-copier lamp support rods 82 and 83 and the enlarger-copier lens support rods 84 and 85 which may be bolted or otherwise fastened to said frames by any means such as collars 86.

PLATEN COVERS

The platens are mounted in suitable openings formed in the top skin of desk 1, as shown in outline form in FIG. 1. Each platen consists of a transparent material such as glass and is adapted to hold the document to be placed on it for copying or enlarging and copying. Above platen 12 is a platen cover 92 to force the document to be copied into intimate contact with the platen 12, the platen cover being provided with a handle 94 at one end thereof to permit an operator to lift the platen cover from the platen 12. At platen 14, for use in producing copies from semi-micro data, there is a document alignment device 96 to maintain semi-micro documents in registration with the enlarger-copier optical system so that the data may be properly positioned for enlarged imaging on the xerographic drum.

The document alignment means of the semi-micro portion of the apparatus is a rigid platen cover 96 with a transparent portion 100 formed of glass or a similar material. The cover 96 is screwed to the semi-micro desk section platen top at the rear portion of the cover so that the transparent portion 100 overlays platen 14. On the clear portion 100 of the platen cover 96 are alignment marks 102 formed as lines thereon and painted or cut into said clear portion 100. These marks indicate to an observer the effective area of copyability of a document placed on platen 14 for enlarging and copying. The transparent portion 100 is formed to provide a clearance fit between its bottom surface and the top of the semi-micro platen glass 90 coincident with platen 14. The clearance is of a dimension to permit the platen cover to exert a pressure force on a card or document placed thereunder between the bottom surface of the transparent portion 100 and the top of the platen glass 90. The clearance is .005 inch and the document card primarily used for enlarging and copying is .007 inch in thickness proving a .002 inch interference to insure pressure on the card for preventing slipping and insuring flatness of the document on the platen.

The transparent portion 100 is glued to or in some other manner securely and intimately attached to the platen cover 96. The bottom surface of the cover is spaced above the platen surface, except the rear portion where it is mounted to the desk, to provide the clearance fit referred to above. This permits the placing of a document on platen glass 90 from the front or either side of the platen cover 96.

Figure 5:
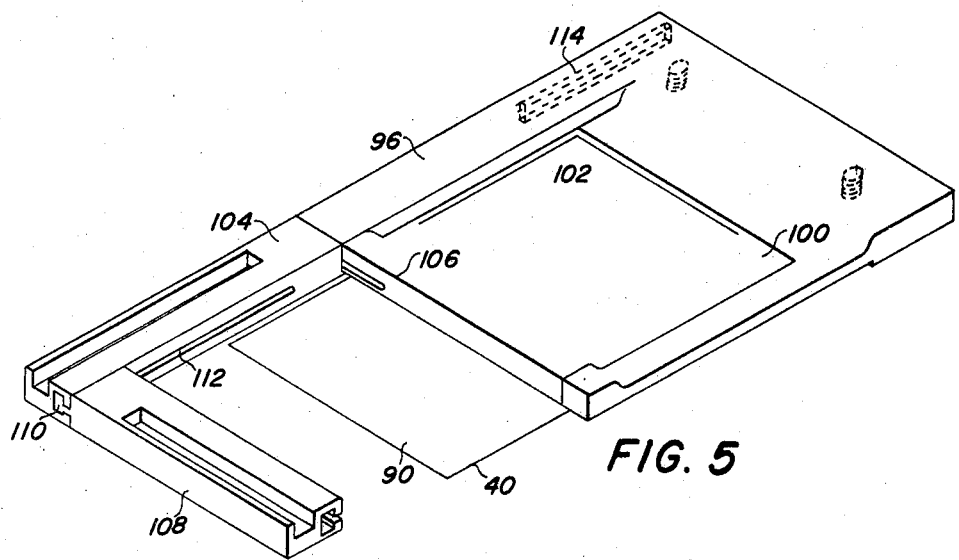
FIGURE 5 is an isometric view of the semi-micro platen cover.

The cover 96 is provided with a document registration means comprised of two members positioned at right angles to each other and to a section of the platen cover 96. The members are positionable within grooves placed in platen cover 96 and its transparent portion 100. If the document, generally of the data card size and shape, is to be positioned lengthwise across platen 14, as is the usual case for "3× cards" reduced 3.426×, then the registration members would be positioned relative to the platen cover 96 in the position shown in FIG. 5 with the first member 104 positioned in a bottom groove 106 of the cover 96. The groove 106 extends from the left-hand bottom side of the platen cover 96 and into the transparent member 100 across but below a portion of platen 14. Member 104 has a protruding portion designed for slidable engagement with the groove 106 permitting the registration member 104 to be slidably mounted from the side of the platen cover 96 into the groove 106. Thereby, the registration member 104 may be slid parallel to the front of the platen 14 to line up the lefthand side of the card or document placed under platen cover 96 and on platen 14. The groove 106 and the protrusion on the registration member 104 are matched such that there is a slight pressure fit whereby the member 104 may be moved within the groove but will maintain the position in which it is placed until an external force moves it to another position.

The second registration member 108 is positionable within the first member 104 in the same manner as the first member 104 is positionable into the platen cover 96, i.e., it has a protrusion 110 which is pressure fitted into a groove 112 within the first ember 104. This permits the second member 108 to be slidable within the groove of the first member in a direction parallel to the long dimension of the platen 14. Therefore, when a document or card is placed under platen cover 96 and more of the same size documents or cards will follow, the first may be properly aligned on platen 14, as described hereinafter, and the registration members 104 and 108 may be brought into touching contact with the document. Further documents may then be swiftly placed under the platen cover 96 in registration for exposure on platen 14.

If the documents are data cards to be placed across the narrower dimension of platen 14, as normally would be the case with cards having images on them reduces 2.753×, the registration members may be placed in groove 114 in the upper portions of platen cover 96. The members may then be maneuvered to register cards in the same manner as they were on the lower portion. The apparatus functions as a slidable T-square with the first member 104 fitted into groove 106 or 114 to act as a register for the side portion of the document placed at platen 14 and the second member 108 acts as a register for the rear of the same document whereby the documents are placed in touching contact with both members in order to register the image thereon with the alignment marks 102 on the transparent portion 100 of the platen cover 96.

When a document, usually a data bearing card, is placed on the platen glass 90 under the cover 96, the image on it may be viewed by pressing the "Document Registration" switch 116. This ignites the semi-micro lamps 50 which emit sufficient illumination to render the document translucent, and since the platen cover glass 100 is transparent, this permits the operator to view the opaque data on the card through the transparent cover portion 100 and properly align such image within the alignment marks 102. The slidable registration members may then be moved laterally across the desk portion of the machine to permit the proper registration of other documents of the same size placed on platen 14 without the need to view each document by use of the lamps 50 to insure registration within the marks 102 and therefore the imaging system of the semi-micro mode.

OPTICAL DRIVE SYSTEM

Illumination for each of the scanning systems is provided by a pir of fluorescent lamps 42 for the copier mode and 50 for the semi-micro mode. The lamps for each mode are mounted in a lamp carriage which is substantially U-shaped along the major portion of its length and has a pair of oppositely directed light reflectors secured thereon adjacent and parallel both to the side walls of the lamp carriage and to the longitudinal slot aperture formed in the bottom wall of said carriage. The carriage for the copier mode is designated 120 with slot aperture 122 therein while the carriage for the semi-micro mode is designated 124. For a more detailed description of the lamp carriage, see Rutkus Patent No. 3,062,095, issued Nov. 6, 1962, not specifically the description relating to FIGS. 10–13. The lamp carriages and the lamps therein are caused to scan across the respective platens they illuminate by means of a cable drive system depicted in FIG. 6 and more fully described hereinafter.

Lamp carriage 120 moves through channels 68 and 70 in its scan of platen 12. The movement is controlled by lamp scan pulley 126 and its drive cable 128 which is attached by screws and lugs (not shown) to lamp carriage 120 on the right side of said carriage as observed in FIG. 4. Also connected to the lamp carriage 120 is a cable 130 which attaches to both ends of lamp carriage 120 and maintains it at right angles to lamp carriage channels 68 and 70 during its scan. The connection of this cable and its pulley system to the lamp carriage is more fully described in the Rutkus patent cited above.

The laterally movable lens assembly of the copier mode consists of a suitable lens 46 positioned in lens carriage 132. The lens carriage, as seen in FIG. 4, is movably supported on its left-hand side by two sets of guide wheels 134 spaced at an angle of 90° from each other riding on the top of the left-hand lens carriage rod 72, the wheels being attached and secured to the lens carriage. On the right-hand side of the lens carriage, a similar support exists. The guide wheels in cooperation with the guide wheel on the under side of rod 72 retains the lens carriage in alignment with the lens carriage support rods.

The drive system for the scan of lens 46 is controlled by lens scan pulley 136 rigidly shafted to copier lamp scan pulley 126. Around the lower portion of pulley 136 is the copier lens drive cable 138. Pulleys 126 and 136 operate in such a manner that they maneuver drive cables 128 and 138 such that the scan of copier lamp carriage 120 and copier lens carriage 132 conform to the movement of drum 10, enabling a flowing image of the data placed on platen 12 to be reproduced at approximately 100% of its original size on the photoconductor of drum 10 which flows passed the stationary exposure slit 18 in direct timed relation to the scan by the lamps and lens of the copier system of the document on platen 12.

SEMI-MICRO OPTICAL DRIVE

Attached to copier lens carriage 132 by a suitable clamp 140 is the cable drive system for the entire semi-micro mode optical system. As shown in FIG. 6, the main drive cable 142 is clipped to the copier lens carriage and is connected to the main drive pulley 144 of the semi-micro mode. The cable drives for both the illumination and lens system of the semi-micro mode are driven by pulley 144.

Semi-micro illumination drive cable 146 and lens scanning drive cable 148 are connected to their drive pulleys 150 and 152, respectively. These latter two pulleys are shafted directly to main pulley 144 by shaft 154 passing through side plate 78 of the main frame of the machine.

Cable 146 is connected to the semi-micro lamp carriage 52 at clip 156 which is bolted to bed 158 of the lamp carriage by nut and bolt 160. Cable 148 controls the movement of lens 54 through its connection at clamp 162 to lens carriage 164.

The lamp carriage 52 is movably supported on rod 82 by two bearings (not shown) which permit movement in the direction of scan along the rod 82 and further serve to maintain alignment of the lamps normal to the direction of scan. The lamp is further supported by a bearing on rod 83 which also serves to insure proper movement along the direction of scan. The lens carriage 164 is similarly supported along rods 84 and 85 having two bearings 166 and 168 on rod 84 and one bearing 170 on rod 85. The bearings serve not only for support of the carriage along the rods but also to maintain proper alignment during the scanning motion of the lens.

The semi-micro mode of this apparatus is comprised of a direct optical system. Therefore, all adjustments on focus, alignment, and magnification must be corrected for in the lens or lens mounting. The machine is made capable of enlarging and copying original data that is magnified either 3.426 times or 2.753 times by merely changing the lenses in lens mounting 172 and the speed of the wire cable driving the system by placing smaller diameter pulleys in position at pulleys 150 and 152 causing faster motion of the semi-micro illumination and lens mount, respectively, for the 2.753 magnification and larger pulleys for reducing the speed of the illumination and lens system for the 3.426 magnification. These two magnifications are chosen because of the standard sizing of the reduced data on semi-micro materials, but any other magnification or adjustment is possible in like manner as that above.

Figure 9:
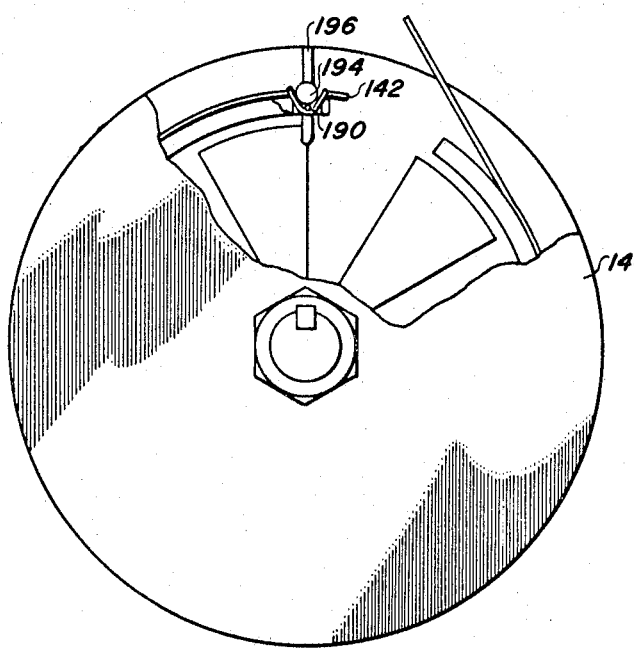
FIGURE 9 is a side view of the pulley of FIGURE 8.
Figure 8:
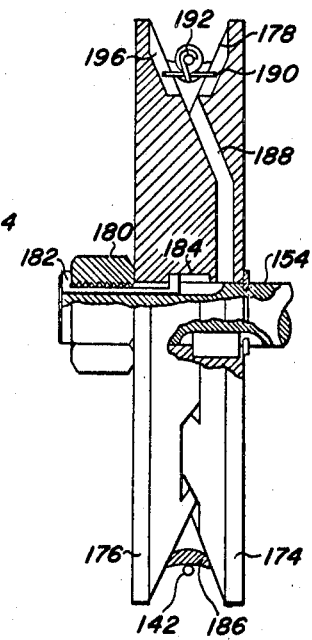
FIGURE 8 is a front view, partly in section, of the semi-micro scan drive pulley.

The speed of the illumination and lens systems of the semi-micro mode is responsible for the flow of the image upon the photosensitive surface of the drum below the optical system. Tolerance adjustments of the speed of the optical system of the semi-micro mode may be corrected by factory adjustment of the semi-micro drive pulley 144 which is shown enlarged in FIGS. 8 and 9. This pulley clamps main drive cable 142 which is fastened to the copier lens mounting by clamp 140 and wraps 360° around its effective perimeter. The radius of this pulley may be varied by moving one of the two identical sides 174 in a direction perpendicular to its axis and relative to the other side 176. Each side has an inclined upper, inner face 178. This permits the variance of the inside diameter as the two sides are moved relative to each other. The shaft 154 passes through the central axis of the sides and is threaded to accommodate nut 180 used for adjusting the variable radius of the pulley.

The nut and side 174 are keyed together by key 182 in such a manner that they do not change relative distances to one another. Therefore, as nut 180 is rotated about threaded shaft 154 it moves inward or outward along the shaft pulling therewith side 174. Side 176 is keyed in a fixed position with shaft 154 by key 184 hence, as nut 180 and, therefore, side 174 are moved parallel to shaft 154, the inside radius of the pulley is changed because of its inclined face 178.

Riding along edge 178 of the two sides is a rider 186 in which the cable 142 is maintained. This rider allows for greater adjustment of the inside radius of the pulley then would be available if cable 142 alone rode on the inclined inner face of the sides directly. This is so because the cable would likely catch in the meshing portions 188 of the two sides. The cable is securely maintained on the rider 186 by a pin device comprising cross pin 190, U-spring 192 and ball 194.

The rider 186 is formed of a rigid resilient material such as steel and is arcuate in shape to conform generally to the circumference of the pulley. It is placed between the two sides and rides along the inclined faces 178 as the sides are moved relative to each other on its inner rounded surface. The outer surface of the rider 186 is arcuately recessed such that the radius is greater than that of its curved surface.

There is a spherical indentation in the outer surface of said rider which is adapted to receive a ball 194 that is swedged on cable 142. Below the indentation is a hole drilled through the side of the rider of a dimension suitable to accept a pin 190 used as part of the locking mechanism to secure the cable 142 to the rider and prevent relative movement therebetween. Another hole which is perpendicular to the drilled hole and centered approximately through the center of the spherical indentation is formed completely through the rider. This accepts a generally U-shaped spring 192 which is adapted to hook over the cable 142 on both sides of the ball 194 swedged thereon.

The clamping operation consists of placing the spring 166 over the cable 142, hooking it on both sides of the ball 194 and slipping pin 190 between the ball and bottom inner portion of the U-spring 192 passing the pin 190 through the hole drilled in the rider 186. This locks cable 142 to the member. A groove 196 is cut into both side portions of the pulley to receive the pin 190 when the rider and cable are placed into operative position. This prevents rotational slippage of the rider along the periphery of the pulley.

As the pulley is rotated, part of the cable wrapped around it will be removed from a contact position with the pulley or the rider around it. It is important that the locking device not be on this portion of the cable or it will pull the rider out of position. Therefore, when the cable is secured to prevent slippage by a locking mechanism, the pulley rotation is limited to the number of degrees that the cable contacts around the pulley inner circumference. If the cable is held by friction, however, this limitation does not exist.

The two sides 174 and 176 may be formed by casting and are meshed together by rotating one in relation to the other approximately 60°.

The use of this pulley permits more flexible tolerances on the remainder of the scan system of the semi-micro mode. The pulley 144 is caused to rotate by cable 142 which acquires a linear velocity from the speed of pulley 136. The rotational velocity imparted to pulley 144 is related by a factor of its radius to the linear velocity of cable 142. The greater the radius, the lesser its rotational velocity from a fixed cable velocity; the lesser the rotational velocity of shaft 154 and of pulleys 150 and 152 connected thereto and controlling the linear scanning speeds of the optical system of the semi-micro mode. Therefore, the corrections in scan velocities of the optical system of the semi-micro mode may be controlled by the effective, or inside, radius of pulley 144. The relation between the illumination and lens aspects of the optical system of the semi-micro mode are controlled by the fixed dimensions of pulleys 150 and 152, respectively.

This flexibility of changing scanning speed is an important feature because a slow scan by the optical system in relation to the speed of the drum surface will cause the image to such surface to be reduced in size. Conversely, a fast scan speed of the optical system will cause an elongated image on said drum. The function of the pulley 144 therefore, is to insure proper scan speed to maintain the flow of the image from platen 14 to coincide exactly with the flow of the photosensitive surface of drum 10, i.e., no relative motion between the image projected to the drum surface and that surface.

SCAN CONTROL

Because the photoconductive surface of the xerographic drum is curved and in constant motion while the machine is in operation, the image of a copy cannot be projected in its entirety directly onto the photoconductive surface of the xerographic drum. In order to obtain a clear, well-defined image on the xerographic drum, the lenses 46 and 54 are moved to project line images of the copy onto the xerographic drum, the movement of the lenses being synchronized with the movement of said drum so that the line images are properly registered successively with each other on said drum to produce actual reproduction of the copy on said drum surface. To affect uniform illumination of the copy, suitable light sources, such as lamps 42 and 50, are moved at a uniform rate across the copy as previously described, the motion of the light sources being coordinated with the movement of the lenses and the drum.

This synchronized and coordinated movement of the lenses and light sources to scan a copy in correlation with the movement of the xerographic drum is obtained by a scan control mechanism 40. Actually, in operation, the lenses and light sources are moved from their respective starting positions in coordinated motion with the xerographic drum in one direction only, that is, the motion is coordinated with the movement of said drum during the actual scan cycle in which a latent image copy is formed on said drum and then at the end of the scan cycle the lenses and light sources are rapidly returned to their original starting positions, this latter cycle being appropriately termed a return or retrace cycle. It is apparent that since no shutter system is employed with either lens, the xerographic drum is exposed during the return or retrace cycle, but since the drum is constantly in motion the original exposed image on said drum is not obliterated during the retrace cycle since, by this time, the area of the drum carrying the previously formed latent image has passed from the exposure station B to developer station C.

The scan of the semi-micro lens and illumination systems has been previously described in its relation to the scan of the copier system (see FIG. 6). The scan of the copier system, and thereby the semi-micro system, is controlled by a single scan control mechanism, the general arrangement of which in conjunction with the xerographic drum 10 is shown by its major elements as it is mounted on shaft SH–1 which rotates in bearings 200 suitably mounted to the frames of the machine. The free end or right-hand end of the shaft SH–1 receives the drum 10. Pully 202 adapted to be connected by a belt to a source of power, is secured to shaft SH–1 between the xerographic drum and the right-hand face of frame plate 204 as shown in FIG. 7.

Figure 7:
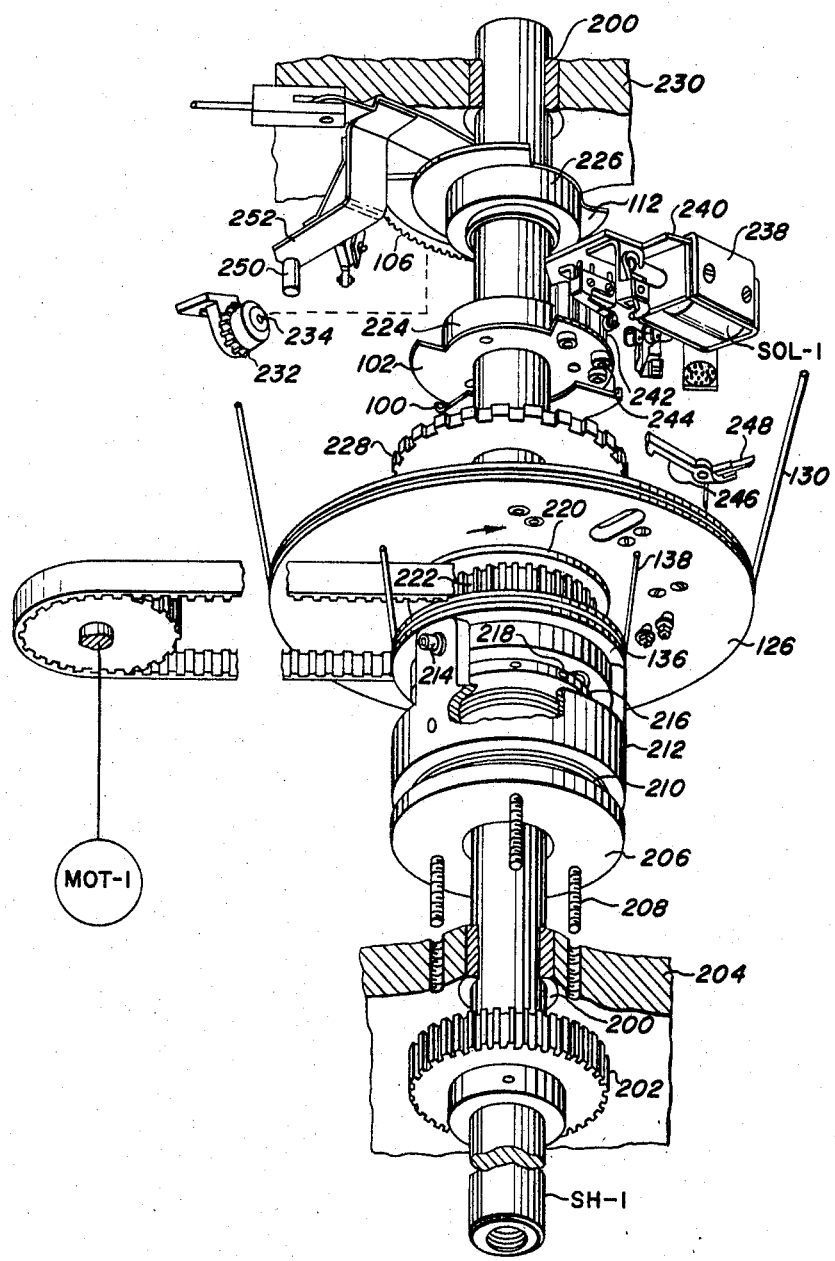
FIGURE 7 is a front view of the xerographic drum and scan control mechanism of the apparatus.

For the details of the scan control mechanism 40, there is shown in FIG. 7 a spring arbor 206 for the return scan movement of the system, secured as by means of screws 208 to the opposite side of frame plate 204 the spring arbor being mounted concentrically with that of shaft SH–1. To affect the return of the lens and illumination systems, there is provided a flat coil return spring 210 encircling the hub of spring arbor 206, the return spring being secured at one end to the spring arbor and at its other end by a spring stud to spring housing 212 fixed, as by screws 214, to the hub of lens scan pulley 136 rotatably supported on shaft SH–1. Thrust collar 216 adjustably secured on the threaded portion of spring arbor 206 by set screws 218 abuts against the lens scan pulley 136.

Fixed to the hub of the lens scan pulley 136 is lamp scan pulley 126 a spacer disc 220 and a brake pulley 222 with screws passing through the lamp scan pulley, spacer disc, brake pulley, and then through the lens scan pulley then engaged by nuts thereby forming a unitary drive pulley assembly.

Inner crown gear 100 and outer crown gear 106 are fixed to discs 108 and 112 respectively, mounted on inner and outer hubs 224 and 226 which in turn are loosely mounted face to face on shaft SH-1 between the drive ratchet 228 and the frame 230. The gear teeth of the inner and outer crown gears mesh on diametrically opposite sides of a pinion gear 232 secured to a stationary gear shaft 234 on gear bracket 236 fixed to the interface of frame 230.

To begin the actual movement of the copier lens carriage 132 and lamp carriage 120 on the scanning cycle, there is provided a normally de-energized scan release solenoid SOL-1 mounted on a solenoid angle bracket 238 fixed to a second bracket 240 secured in spaced parallel relation to the disc 108 of the inner crown gear 100 by spacers 242 and screws 244. The solenoid SOL-1 is normally maintained in a position to move pawl 246 into engagement with the drive ratchet 228. When solenoid SOL-1 is energized, its plunger is retracted engaging pawl lever 248 forcing pawl 246 into engagement with a tooth of the drive ratchet 228. With the pawl engaged in the drive ratchet, the lamp scan pulley 126 and the elements attached thereto are rotated in a clockwise direction until the pawl is forcibly tripped out of engagement from the drive ratchet.

As the lamp scan pulley rotates with the drive ratchet the pawl lever 248 strikes a pawl trip pin 250 on pin bracket 252 secured to disc 112 of the outer gear assembly whereby the pawl is disengaged from the drive ratchet to end the actual scan cycle. Up to this time, as the pawl has been engaged with the driving ratchet, both the lamp scan pulley 126 and the lens scan pulley 136 are rotated as well as the spring housing so that as the pawl is disengaged from the driving ratchet the spring unwinding rapidly acts to return the lamp scan pulley 126 and the elements associated therewith back to their normal starting position.

As the lamp scan pulley is rotated in a clockwise direction, a micro-switch is actuated closing an electrical circuit which normally supplies current to brake motor MOT-1 which brings the entire pulley assembly to a gradual stop. For a more complete detailed description of the scan control mechanism, see Rutkus Patent No. 3,062,095 issued Nov. 6, 1962.

For each scan of the scan control mechanism 40, the copier scan apparatus and the semi-micro scan apparatus perform simultaneously as shown in FIGS. 10 and 11, and FIGS. 12 and 13. FIGS. 10-13 illustrate schematically the relative position of the light sources, lenses, lamp scan pulley and lens scan pulley in relation to both the direct and semi-micro system. FIGS. 10 and 11 show the semi-micro and direct scan system, respectively, in their position for the start-of-scan cycle, i.e., at the extreme right or start position at the rear edge of their respective platens relative to the lamp scan pulley 106 and lens scan pulley 136.

FIGS. 12 and 13 show the semi-micro and direct copier scan systems, respectively, in their end-of-scan position indicating the relation of each with that of lens scan pulley 136 and lamps scan pulley 128. Both systems complete a scan for every scan that is made regardless of the active mode of copying, however, the only lamps activated for illumination will be those of the mode forming an image at drum 10.

SEMI-MICRO LENS MOUNT

The direct optical system of the semi-micro mode of this apparatus is adjustable and corrected at lens mounting 172 which houses lens 54 (see FIG. 14). However, the first adjustment on the optical system is to insure that the object plane lies parallel to the drum axis, represented by shaft SH-1, and the slot 18 in the light shield 16 under which the flowing image of the object at the platen is put on drum 10. In the semi-micro mode, platen 14 maintains the object and is in fact the object plane of the optical system. It is adjusted for tilt by platen tilt screws 254 (see FIG. 4) which maintain ball sockets 256 mounted thereon onto which is suitably fastened desk plate 258 into which platen glass 90 is placed.

When adjusting the tilt of the plane of platen 14, a mirror adapted to reflect a light beam presented thereto from a source held at or near slot 18 in the light shield 16 is placed on the glass 90 mounted therein to maintain a document to be enlarged and copied. The four tilt screws 254 are then adjusted until the reflected light rays from the mirror (substituted for platen glass 90) are reflected along their path of incidence back to slot 18. Screws 254 are then fastened by lock nuts 260 to lock them into place.

The next adjustment feature of the optical system is the lens which must be made flat with respect to the drum axis and the slot 18 in light shield 16. Flattening of the plane of the lens 54 of the semi-micro optical system is accomplished by replacing lens 54 with a mirror in order to reflect a light source made to emanate from the general area of slot 18 in light shield 16. The adjustment is made by turning the three outer screws 262, 264 and a third screw (not shown). The screws are held in position by nuts 266 and 268 with a matching nut on the third screw. The inner lens mounting 270 is movably fitted in the outer housing 272 whose inner bore is such that it slidably accepts the outer diameter of inner housing 270. The housings are pinned together to prevent movement therebetween by pin 274 held in outer housing 272 and entering inner housing 270 at ridge 276.

The ridge permits axial movement of housing 270 in relation to outer housing 272 while preventing rotation between the two. The fined adjustment of the focus of the lens in the optical system is provided by eccentric 278 which is shafted through both the inner and outer housings of the lens mounting and adapted to permit relative movement therebetween. The eccentric is rotated around an axis common both to itself and shaft 280. Therefore, when the shaft and eccentric are rotated, the eccentric causes the inner housing 270 to move relatively upward or downward with respect to the outer housing 272. What in fact occurs is a movement of the lens 54 relative to the lens carriage 132, therefore, changing its position within the conjugate distance of the semi-micro optical system.

The movement of the lens within the fixed conjugate distance provides a means for adjustment of the focus of the semi-micro system. When the proper focus is attained, pin 274 is pressed against inner housing 270 locking the inner housing to outer housing 272, within which pin 274 is rigidly held. The lens 54 must be corrected for tilt angle between its axis and that of the semi-micro optical system. This is accomplished by rotating the lens holder 172 about the vertical optical axis of the semi-micro optical system. The collar 282 supporting the holder 172 has a convex arcuate surface 284 corresponding to the curvature of the concave arcuate surface of tilt lock 286. Because of this, lock nut 288 and lens housing 172 may be rotated about the semi-micro optical axis 290 to insure the coincidence of optical axis 290 with that of the central optical axis of the lens 54. Once the tilt angle is eliminated and the axes coincide, tilt lock 286 is tightened on the threaded surface of inner housing 170 to prevent further rotational movement of lens holder 172 with respect to the optical axis of the semi-micro system. Lock nut 288 is fastened tight against ring 292 formed as an integral part of, or pressed against, lens holder 172 to prevent the latter's movement within inner housing 270.

IMAGE MIRROR MOUNTING

The copier image mirror 48 is mounted to be movable between a first forward position, making it effective in the copier mode of the operation of the machine for copying documents placed at platen 12, and to a second rearward position when the machine is in the semi-micro mode for enlarging and copying documents placed at platen 14. The movement of the mirror from the first forward to the second rearward position serves the following functions: to change the optical path used for bringing an image to the drum surface; to block ambient light emanating from the platen not in use; to ignite the proper illumination system lamps for illuminating the platen in use; to control the light indicators on the control panel of the machine; and to insure proper location for the image mirror 48 when the machine is in the copy mode and the mirror is in the first forward or effective copier image reflecting position.

The entire mounting system is bolted by bolts 294 to side frame plate 80 (see FIG. 15). When in the copier mode the image mirror 48 is held in perfect alignment with the remainder of the copier optical system to effect imaging of data from plate 12 to the drum 10 by positioning device 240. The positioning device 240 is securely mounted to support shaft 66 through bolts 296 to prevent both axial and rotational movement of the positioning device which is further arranged so that the protrusion 242 thereon will engage a receptacle hole in a bracket (not shown) suitably mounted on mirror 244. The end of protrusion 242 is canted at an angle, preferably 15°, to insure its proper engagement with the receptical hole in the mirror mounting to guide the mirror mounting 244 and the mirror 48, firmly attached thereto, into its effective optical position within the copier optical path of the machine. This permits light rays emanating from shaft 122 to be properly reflected by objected mirror 44 through the copier lens 46 to image mirror 48 and thereby precisely reflected to the exposure slot 18 above the drum 10.

Attached to the frame 80 of the machine are two limit switches: copier limit switch SW-1 and semi-micro limit switch SW-2. Each of these switches is a double pole, double throw switch adapted to control: (1) the lamps of the copier and semi-micro illumination systems; (2) a motor 246 which in turn controls the movement of the mirror mounting; and (3) the control panel lamps. Bracketed onto the side frame 80 is the mirror mounting shaft 248, with its partially threaded portion 250, held onto frame 80 by bracket 252. Shaft 248 is rotated by reversible motor 246 controlled by limit switches SW-1 and SW-2. Mounted on shaft 248 at both ends of thread 250 are limit pins 298 and 300. Said pins are located such that the mirror mounting is prevented from overriding the limit switches at either end of its movement along threaded portion 250 of shaft 248. The mirror mounting 244 is securely fastened to said rider 302 causing said mounting to oscillate between its forward and rearward positions as the rider 302 contacts the limit pins 298 and 300 when shaft 248 is rotated in one direction or the other. The limit switches are mounted on the side frame 80 by brackets 304 and 306 held thereon by screws 308 and 310. The mounting 244 is attached to image mirror shaft 66 by two bearings 312 (see FIG. 4).

In operation the mirror mount 244 is oscillated between its effective forward position limited by the contact of the rider 302 with limit pin 298 and its rearward position when the rider strikes limit pin 300. When the mirror mounting is in its effective position, it engages a double pole, double throw switch SW-1 which operates in its contacted state to permit ignition of copier lamps 42 and light the appropriate indicator lights of the control panel. The contact position further causes the disengagement of reversible motor 246 thereby ending the motion of shaft 248.

When moving the mirror mounting 244 from its effective position to a rearward position, motor 246 is turned on by suitable electrical means to rotate shaft 248 in a direction to cause the rider 302 to move along the threaded portion 250 of the shaft rearward to enlarger-copier switch SW-2 and limit pin 300. When contact is broken with switch SW-1, the lamps 42 of the copier illumination system are disconnected from their power source and the light in the control panel which previously indicated "Copy" mode for the machine is similarly disconnected. When the rider 302 reaches limit pins 300 and limit switch SW-2, contacting the arm of said switch, it ignites the light in the control panel indicating the machine is in its "enlarger" mode, and disengages motor 246. Also, the mirror 48 is removed from its effective reflecting position which lies blocking the direct optical path of the enlarger-copier optical system permitting the light rays from platen 14 to travel unhindered to the slot 18 in light shield 16 above the drum 10. Further, light from the platen 12 of the copier mode is harmlessly dispersed about the machine and prevented from directly striking slot 18 because it is not reflected thereto by image mirror 48. Beside this, suitable baffles are connected to the mirror mount 244 to prevent ambient light from the copier system from striking the photosensitive surface of drum 10.

PAPER TRANSPORT MECHANISM

Although any suitable paper feed mechanism may be used for seriatim feeding of cut sheet material into transfer contact with the xerographic drum, the paper feed mechanism used in the preferred embodiment of the invention is of the type disclosed in Mayo Patent No. 3,062,109. The sheet feeding mechanism 314 positioned in the image transfer station D, for seriatim feeding of cut sheet transfer material into contact with the xerographic drum so that the development powder images on the surface of said drum may be transferred to the transfer material, consists of a tray for holding a supply of cut sheet transfer material, separator rollers for separating a single sheet of transfer material from said supply, feed rollers for feeding a single sheet into impression contact with the drum and means for coordinating the operation of the separator rollers and feed rollers to thereby feed a single sheet of transfer material into contact with the drum for proper registration of the powder image on the drum onto the transfer material.

After the proper feeding of a sheet in registration with the image appearing on the drum, the sheet is transported by any suitable means, for example, a continuous belt, passed fuser 28 wherein the powder image attached to the transfer sheet is fused thereon forming a permanent bond with the transfer material. The sheet is then carried by sets of pinch rollers such as set 30, in rotating touching contact with each other and guide plates such as plates 316, used to guide the lead edge of the transfer sheet to the next set of pinch rollers. The rollers are journaled in the frames 318, supporting the transport section of the apparatus and are free to rotate in a direction to carry the transfer material from the fuser section of the apparaus to the copy tray 320. The guide plates are formed to prevent buckling of the transfer sheet as it is pushed by the rollers into contact with the plates. The plates may be formed by stamping and have attached thereto, either as an integral part thereof or in some manner fastened thereon, brackets 322 which are screwed into the transport housing frames 318 by screws 324.

The last set of pinch rollers in the paper feed super structure 2 comprises a lower drive roller 326 formed of a metal shaft in a cylindrical shape appropriately attached to drive belts connected to a motor causing rotation of said lower drive pinch roller 326 in a counterclockwise motion as viewed from the right-hand side of the machine (see FIG. 16). The roller 326 is notched in several places along its axis, the notches placed around the circumference of the roller and normal to its axis. Into these several notches are forced resilient O-rings 330. These O-rings maintain contact with last upper idler roller 332 driving said idler roller in a clockwise position, as viewed from the right-hand side of the machine, when lower roller 326 is driven. Roller 332 rests on the O-rings of roller 326 by the force of gravity due to its own weight.

A notch in approximately the center of the lower roller 326 is formed generally in the same manner and to the same dimensions as the notches supporting the O-rings in the lower roller 326 but is not filled with an O-ring. Upper idler roller 332 is divided approximately at its center and notched thereat. The shafts of the rollers 326 and 332 are positioned within frames 318 such that the central notches in roller 326 and roller 332 approximately coincide at the center of the paper feed super structure 2, as well as the center of both rollers. Fitted on a shaft 336 mounted to side frames 318 of the paper feed super structure is a buckler finger 338 which extends through the aperture formed at the center of rollers 326 and 332 by the notched portions therein. The buckler finger 338 is formed of a rigid, low friction material and extends from above the last sheet feed guide plate 340 through the aperture formed between rollers 326 and 332 to a position in front of and horizontally below the tangential plane of contact between the two last rollers. The finger is biased to this position by spring arm 342 hinged to finger 338 at shaft 336 and maintained in its biasing position by curved bracket 344 mounted on a cross plate 346 suitably fastened to frames 318 by screw 348.

In operation, as a transfer sheet traverses the contact point of top pinch rollers 326 and 332, it is engaged on its top surface by the bottom side of finger 338 causing the sheet to emerge from the paper feed super structure 2 in an arcuate manner with its center vertically below is side edges as viewed from the front of the machine imparting to the sheet a beam strength. The bias placed on finger 338 from spring arm 342 hinged to said finger 338 at shaft 336 creates a slight downward pressure on the finger enabling it to maintain a sheet passing thereunder in the bowed position without creasing the sheet.

The deflection of the transfer sheet material, generally paper stock, gives the material a rigidity which it would not otherwise possess. This rigidity permits the transfer sheet to extend out from the top pinch rollers 326 and 332 in a generally linear path whereby the lead edge leaving the last pinch rollers 326 and 332 remains forward of the remainder of the transfer sheet along an imaginary path coincident with its exit direction from the last set of rollers. When the trailing edge of the sheet is ejected from rollers 326 and 332, the sheet drops substantially vertically downward to copy tray 320. The copy tray dips approximately 15° with the horizontal tilting from the front of the machine downward to its rear portion. The rear edge of tray 320 is located substantially in a vertical line with the axis of rollers 326 and 332.

The ejected transfer sheet exiting from rollers 326 and 332 emerges therefrom substantially parallel to copy tray 320 and falls such that all the points hereon remain essentially parallel to the copy tray 320. Without the buckler finger 338 or another suitable device, the transfer sheet would fall under the force of gravity causing the lead edge to contact copy tray 320 near its rear edge and buckle, falling onto copy tray 320 either upside down or to remain buckled.

MACHINE OPERATION

The apparatus in its rest position may be ready to function in either the copier or the enlarger-copier mode depending on in which mode it was last manually programmed to be operated. When the machine is turned on, by the operator pressing the ON button 350 on the control panel 3, the several processing systems will be activated and made ready for the actual copying or enlarging and copying from a document placed at either platen 12 or 14, respectively. For the operation of the electrical system when a copy is being made, see the Mayo patent referred to above. By depressing the ON button, the xerographic drum 10 is caused to rotate, the several corotrons around the drum are actuated, the developer mechanism begins to circulate developed and bring it into contact with the xerographic drum surface, and the fuser is ignited. Also, the lamps in the control panel and the print number indicator lamps are lighted showing the operator the number of copies programmed to be copied from a single document and the mode and state of the machine.

If the mode of the machine is that which the operator intends to use, he need only adjust the number of copies knob 352 on the control panel thereby selecting the number of scans to be made by the optical system of the document placed at the selected object plane and, therefore, the number of copies of such document to be made. If the machine is not in the mode required by the operator, he must then press either the COPY button 354 or the ENLARGE button 356 found at the top left and right-hand corners, respectively, of the control panel 3.

Let us assume that the machine is in the copier mode and the operator wishes to enlarge and copy a semi-micro data document which he places on platen 14. He first notices, after pressing the ON button 350, that the lamps 358 indicating that the machine is in the ready or "Reload" state are lighted. Also, the lamps 360 showing the machine is operable in the "Copy" mode are on. He then depresses the ENLARGE button 356 which causes motor 246 to operate whereby shaft 248 is rotated in a counter-clockwise direction causing rider 302 thereon to ride along the threaded portion 250 thereof breaking contact with the limit switch LS–1, thereby turning off lamps 360 in the control panel which previously indicated that the machine was in the copier mode. When neither limit switch LS–1 nor LS–2 is contacted, an interlock mechanism prevents the scanning of the illumination and lens system if the operator inadvertently attempts to initiate a scan. As the rider moves to the rearward portion of the shaft 248, it carries therewith the image mirror mounting 244 as well as the image mirror 48. When the rider reaches the end of its travel along the threaded portion 250 of shaft 248 it contacts the limit switch LS–2 igniting the lamps 362 in the control panel indicating the machine is in the "Enlarge" mode. The contacting of the limit switch LS–2 also disengages the operation of the motor 246 causing shaft 248 to discontinue its rotation movement. The machine is now in the proper position for enlarging and copying documents placed on platen 14. The operator may now press the PRINT button 364 or auxiliary PRINT button 366 on the desk top on the platen 14 side of the apparatus. This will ignite the lamps 368 indicating the condition of the machine is in the operating or "Print" state and turn off lamps 358 indicating the machine is ready to be reloaded.

By depressing either of the PRINT buttons 364 or 366, the optical systems of both modes are caused to traverse their respective platens. However, since the machine is in the enlarger mode, because the switch LS–2 has been contacted, only the lamps 50 of the enlarged-copier mode are ignited during the scanning traverse of the platens. Since the image mirror 48 is moved to the rear of the machine, it is no longer blocking the direct optical path of the enlarger-copier mode and the reflected light from the illumination lamps 50 to the data on the document at platen 14 passes through lens 54 directly to slot 18 in light shield 16 over the xerographic drum 10 causing a latent electrostatic image to be formed thereon corresponding to the data on the document at platen 14 but enlarged to whatever magnification the optical system is set, here approximately 3×.

Now let us assume that the machine is in the enlarger-copier mode and the operator wishes to copy from a standard document which he places at the copier platen 12. He presses the ON button 350 and will note that the machine and the lamps 358 indicating the "Reload" state of the machine and the lamps 362 indicating the "enlarge" mode of the machine are lighted. He now presses the COPY switch 354 located in the upper left-hand side of the control panel 3. This causes motor 246 to operate, whereby shaft 248 is rotated in a clockwise direction causing the rider 302 thereon to ride along the threaded portion 312 thereof breaking contact with the limit switch LS-1, thereby turning off lamps 362 in the control panel which previously indicated that the machine was in the enlarger-copier mode. As the rider moves to the forward portion of the shaft 248, it carries therewith the image mirror mounting 244 as well as the image mirror 48. When the rider reaches the end of its travel along the threaded portion 250 of shaft 248 it contacts the limit switch LS-2 igniting the lamps 360 in the control panel indicating the machine is now in the "copier" mode. The contacting of the limit switch LS-1 also disengages the operation of the motor 246 causing shaft 248 to discontinue its rotational movement. Further, the image mirror is positioned in the optical path of the copier optical system through its engagement with the protrusion 242 on the positioning device 240.

The machine is now in the proper position for copying documents placed on platen 12. The operator may now press the PRINT button 346 or the auxiliary PRINT button 366, which may be more convenient. Since the machine is in the copier mode, because the switch LS-2 has been contacted, only the lamps 42 of the copier mode are ignited during the scanning traverse of platens. The igniting of either lamps 42 or 50 is controlled by circuitry connected through the limit switches LS-1 or LS-2, respectively. The image mirror 48 is moved and precisely held in its effective copying position within the optical path of the enlarger-copier system preventing light emanating from the platen 14 from striking the photosensitive surface of the xerographic drum 10. For a complete description of the cycling and registration of the paper feed system and the multiple copy indicator and selection, see the Mayo patent cited above.

While the invention has been described with reference to the structure disclosed herein, it is not confined to the details set forth, and this application is intended to cover such modifications or changes as may come within the purposes of the improvements or the scope of the following claims.

What is claimed is:

1. In a xerographic machine for producing reproductions from original documents onto copy media, such machine including a xerographic plate and a processing system for forming copies from original documents, the improvement comprising:
   multiple object planes each adapted to maintain a document thereon,
   multiple imaging apparatus adapted to illuminate and project the object at each of said multiple object planes,
   light directing means adapted to be movably positioned to cause the image light rays of one of said multiple object planes to strike the xerographic plate, and said light directing means adapted to prevent the light rays emanating from the remainder of said multiple object planes from striking the xerographic plate,
   said multiple imaging apparatus having further associated therewith an energizer means for selectively causing said imaging apparatus to illuminate and project one of said multiple object planes to the xerographic plate.

2. The apparatus of claim 1, including an energizer means having first and second limit switches positioned to be activated by said light directing means.

3. In a xerographic machine for producing reproductions from original documents onto copy media, such machine including a xerographic plate and a processing system for forming copies from original documents, the improvement comprising:
   multiple object planes each adapted to maintain a document thereon,
   multiple imaging apparatus adapted to illuminate and project the object at each of said multiple object planes,
   light directing means adapted to be movably positioned to cause the image light rays of one of said multiple object planes to strike the xerographic plate, and said light directing means adapted to prevent the light rays emanating from the remainder of said multiple object planes from striking the xerographic plate
   wherein said multiple imaging apparatus comprises a first object plane, a second plane, a folded optical means having mirrors adapted to present an image of the data on said first object plane at the xerographic plate, and a direct optical system adapted to present an image of the data on said second object plane at the xerographic plate.

4. The apparatus of claim 3 wherein a mirror in said folded optical means is movable from its normal effective position, to present an image of the data at said first object plane to the xerographic plate, to a second position out of the optical path from said first object plane to the xerographic plate, said mirror having motor means associated therewith to effect such movement.

5. The apparatus of claim 4 wherein said mirror has associated therewith light baffle means to block light rays emanating from said first object plane when said mirror is in said second position.

6. The apparatus of claim 4 wherein said normal effective position of said mirror is positioned in the optical path of the direct optical system of said second object plane whereby said mirror blocks the light rays emanating from said second object plane from effecting the xerographic plate.

7. In a xerographic machine for producing reproductions from original documents onto copy media, such machine including a xerographic plate and a processing system for forming copies from original documents, the improvement comprising:
   multiple object planes each adapted to maintain a document thereon,
   multiple imaging apparatus adapted to illuminate and project the object at each of said multiple object planes,
   light directing means adapted to be movably positioned to cause the image light rays of one of said multiple object planes to strike the xerographic plate, and said light directing means adapted to prevent the light rays emanating from the remainder of said multiple object planes from striking the xerographic plate
   wherein said light directing means includes a mirror and opaque light baffle means positionable to intersect the optical paths of the multiple imaging apparatus such that the mirror directs light rays from one object plane and the baffle means block light rays from the remaining object planes to the xerographic plate.

8. A photographic apparatus for producing reproductions from optical objects onto copy media, such apparatus including:
   a photosensitive member,
   multiple object planes each adapted to maintain an object thereon,
   multiple imaging apparatus adapted to illuminate and project the object at each of said multiple object planes,
   moveably positionable light directing means for directing the light rays from one of said multiple object planes to strike the photosensitive member, and means for preventing the light rays emanating from the other of said multiple object planes from striking the photo-sensitive member.

9. The apparatus of claim 8 wherein said multiple imaging apparatus includes at least one optical scanning system.

10. The apparatus of claim 8 wherein said multiple imaging apparatus includes optical elements associated with each of the multiple object planes for producing like size images at the photosensitive member by magnifying the objects at the multiple object planes to different magnifications.

11. The apparatus of claim 10 wherein said multiple imaging apparatus includes optical scanning means having drive means associated therewith for moving optical elements thereof simultaneously for reproduction of the objects at the object planes onto the photosensitive member.

12. The apparatus of claim 8 wherein said means for preventing light rays from th other of said multiple object planes from striking the photosensitive member is cooperatively attached to said light directing means to be moveably positionable therewith.

References Cited

UNITED STATES PATENTS

| | | | |
|---|---|---|---|
| 2,487,561 | 11/1949 | Landrock et al. | 355—46 |
| 3,167,997 | 2/1965 | Robin. | |
| 3,379,106 | 4/1968 | Hewes et al. | 95—1.7 |

NORTON ANSHER, Primary Examiner

R. L. MOSES, Assistant Examiner

U.S. Cl. X.R.

355—43